US011926202B2

(12) United States Patent
Jüngling et al.

(10) Patent No.: US 11,926,202 B2
(45) Date of Patent: Mar. 12, 2024

(54) ROOF SYSTEM (71) Applicant: Inalfa Roof Systems Group B.V., Oostrum (NL)

(72) Inventors: Rainer Gerhard Jüngling, Mönchengladbach (DE); Marcel Johan Christiaan Nellen, Merselo (NL)

(73) Assignee: Inalfa Roof Systems Group B.V., Oostrum (NL)

( * ) Notice: Subject to any disclaimer, the term of this patent is extended or adjusted under 35 U.S.C. 154(b) by 4 days.

(21) Appl. No.: 17/865,758

(22) Filed: Jul. 15, 2022

(65) Prior Publication Data
US 2023/0022266 A1 Jan. 26, 2023

(30) Foreign Application Priority Data
Jul. 20, 2021 (EP) .................................... 21186741

(51) Int. Cl.
*B60J 7/043* (2006.01)
*B60J 1/20* (2006.01)
*B60J 7/053* (2006.01)
*B60J 7/057* (2006.01)

(52) U.S. Cl.
CPC ............. *B60J 7/043* (2013.01); *B60J 1/2011* (2013.01); *B60J 7/0435* (2013.01); *B60J 7/053* (2013.01); *B60J 7/0573* (2013.01)

(58) Field of Classification Search
CPC . B60J 7/043; B60J 7/0435; B60J 7/053; B60J 7/0573; B60J 7/024; B60J 7/022
USPC ..... 296/216.08, 221, 222, 223, 220.01, 2, 3, 296/4, 5
See application file for complete search history.

(56) References Cited

U.S. PATENT DOCUMENTS

| 3,873,150 A | 3/1975 | Marr et al. |
| 4,005,901 A | 2/1977 | Lutke et al. |
| 6,158,803 A | 12/2000 | Reihl et al. |

(Continued)

FOREIGN PATENT DOCUMENTS

| EP | 0221241 A2 | 5/1987 | |
| EP | 2450210 B1 * | 3/2014 | ............. B60J 10/82 |

(Continued)

OTHER PUBLICATIONS

European Search Report in corresponding European patent application No. 21186741 dated Feb. 2, 2022.

*Primary Examiner* — Dennis H Pedder
(74) *Attorney, Agent, or Firm* — Steven M. Koehler; Westman, Champlin & Koehler, P.A.

(57) ABSTRACT

A roof system comprises a stationary part configured to be attached to a fixed roof and includes guide rails on opposite sides of a roof opening. The guide rails slidably support an operating mechanism for a panel and include guide grooves bordered by guide flanges. The operating mechanism includes a driving slide for a panel front support, and a panel rear support. The rear support is connected to a panel bracket guide of a panel bracket extending alongside a corresponding edge of the panel. The panel bracket guide slidably engages the rear support so as to enable the panel to slide with respect to the rear support when the front support is driven by the driving slide. The front support engages a guide rail groove of an upright flange of each guide rail while the panel bracket guide extends mainly on the other, inner side of said upright flange.

15 Claims, 9 Drawing Sheets

(56) References Cited

U.S. PATENT DOCUMENTS

| | | |
|---|---|---|
| 6,164,718 A | 12/2000 | Stallfort |
| 6,224,146 B1 | 5/2001 | Willard et al. |
| 6,257,658 B1 | 7/2001 | Nabuurs et al. |
| 9,266,415 B1 | 2/2016 | Nellen et al. |
| 10,960,742 B2 | 3/2021 | Hiramatsu |
| 10,974,580 B2 | 4/2021 | Carlson et al. |
| 2002/0021031 A1 | 2/2002 | Radmanic et al. |
| 2011/0285181 A1 | 11/2011 | Manders |
| 2012/0235448 A1* | 9/2012 | Grimm ............ B60J 7/0435 296/216.08 |
| 2015/0130225 A1 | 5/2015 | Sawada et al. |
| 2016/0031301 A1 | 2/2016 | Nellen et al. |
| 2019/0299761 A1 | 10/2019 | Hirmatsu |
| 2023/0026689 A1 | 1/2023 | Jüngling et al. |

FOREIGN PATENT DOCUMENTS

| | | |
|---|---|---|
| ES | 2462922 T3 | 5/2014 |
| GB | 384356 A | 12/1932 |
| WO | 2010088951 A1 | 8/2010 |

\* cited by examiner

ROOF SYSTEM

BACKGROUND

The discussion below is merely provided for general background information and is not intended to be used as an aid in determining the scope of the claimed subject matter.

In modern cars there is quest for maximizing headroom and maximizing the daylight opening in roof systems.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

A roof system comprises a stationary part configured to be attached to a fixed roof and includes guide rails on opposite sides of a roof opening. The guide rails slidably support an operating mechanism for a panel and include guide grooves bordered by guide flanges. The operating mechanism includes a driving slide for a panel front support, and a panel rear support. The rear support is connected to a panel bracket guide of a panel bracket extending alongside a corresponding edge of the panel. The panel bracket guide slidably engages the rear support so as to enable the panel to slide with respect to the rear support when the front support is driven by the driving slide. The front support engages a guide rail groove of an upright flange of each guide rail while the panel bracket guide extends mainly on the other, inner side of said upright flange.

Due to the inward placement of the panel bracket guide and thus the co-operating rear support it is possible to position the guide rails more outwardly, especially in roof systems in which the panel is wider at the front than at the rear.

Preferably, the rear support is mainly stationary and is positioned substantially behind said upright flange of the guide rail.

The upright flange may be the innermost functional flange of the guide rails, especially if sunshade is integrated in the panel.

If the upright flange is the innermost functional flange of guide rail, the guide rail can be made relatively narrow, thereby further increasing the daylight opening.

An even further increase can be obtained if the lateral inner side of each guide rail includes a tapering along at least a part of its length to follow at least partly a tapered shaped of the panel, the roof system including a head liner to cover the fixed roof and frame of the roof system from below, said headliner following the tapering of the guide rails.

The guide rails may be even narrower if the upright flange borders the guide groove of a slide shoe of the front support, especially if said slide shoe is only guided in the guide groove of the upright flange, and not also in an opposite guide groove.

If the panel bracket is attached to a panel reinforcement of the panel by means of screws outside the upright flange of the guide rail, it is possible to reach the screws with a tool without being hindered by an interfering part of the guide rail or of the operating mechanism.

The slide shoe may be part of a slide shoe support which is connected to the lateral outer side of the panel bracket, which is preferably formed by a lever of the front support determining the height of a front side of the panel.

In one embodiment, the lever comprises a curve co-operating with a locking cam on the driving slide of the operating mechanism to which a drive member is connected. The shape of the curve determines whether the lever of the front support is pivoting and/or sliding.

Thus, according to an aspect of the invention, the panel rear support is positioned more inwardly towards a longitudinal centerline of the roof system than the panel front support.

Preferably, the panel bracket guide extends more inwardly than a slide shoe of the panel front support.

If the panel front support includes a front lever and the panel rear support includes a rear lever, the rear lever is positioned more inwardly than de front lever.

BRIEF DESCRIPTION OF THE DRAWINGS

The roof system will be further elucidated with reference to the drawings showing an embodiment of the roof system by way of example only

FIGS. 7*a*-7*e* are enlarged sectional views along the lines VIIa to VIIe in FIG. 2*c*.

DETAILED DESCRIPTION

Figure 1A:
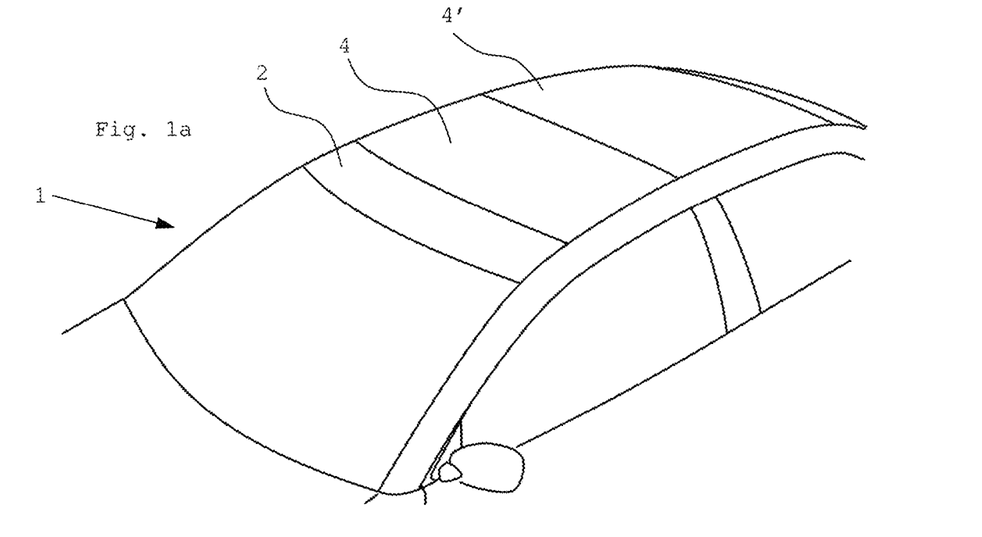
FIGS. 1*a* and 1*b* are schematic perspective views of a vehicle roof having a roof system of which the panel is shown in closed and open position, respectively.
Figure 1B:
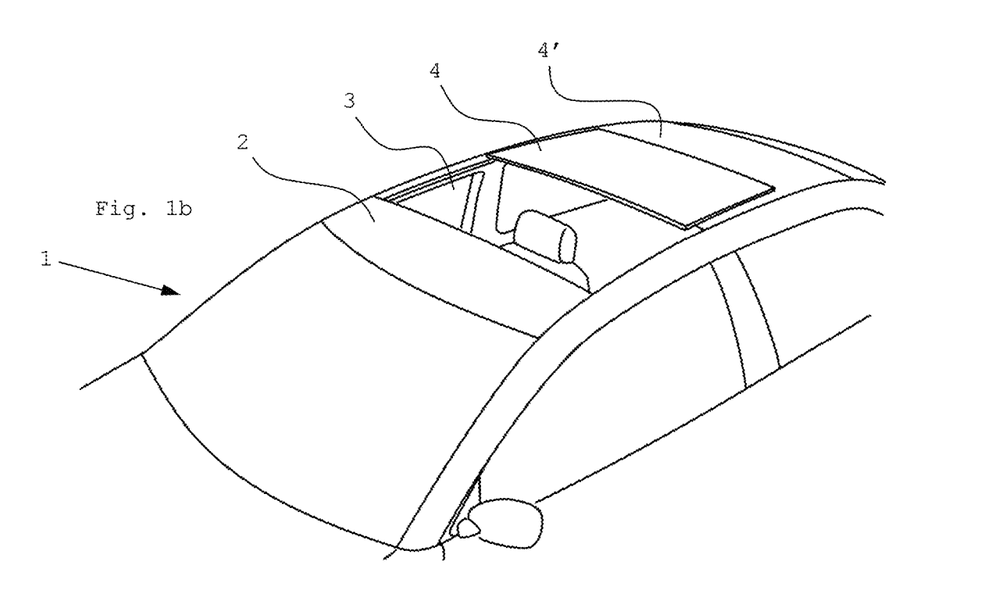
Figure 2A:
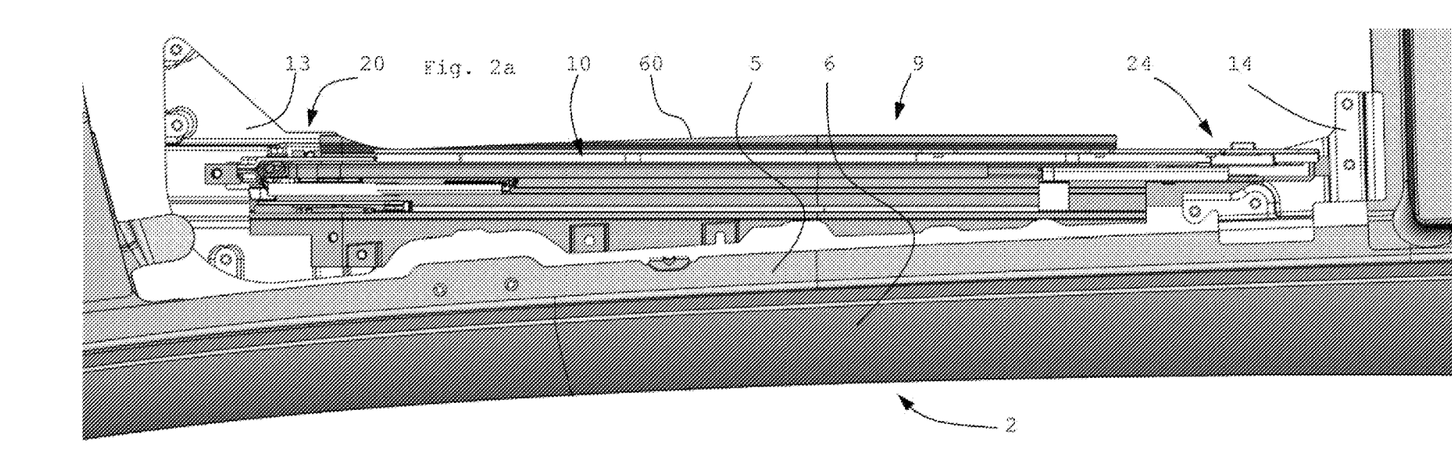
FIGS. 2*a* and 2*b* are plan views of a part of the vehicle roof of FIG. 1*a* without the panel, and without the frame in FIG. 2*a* and with the frame in FIG. 2*b*.
Figure 2B:
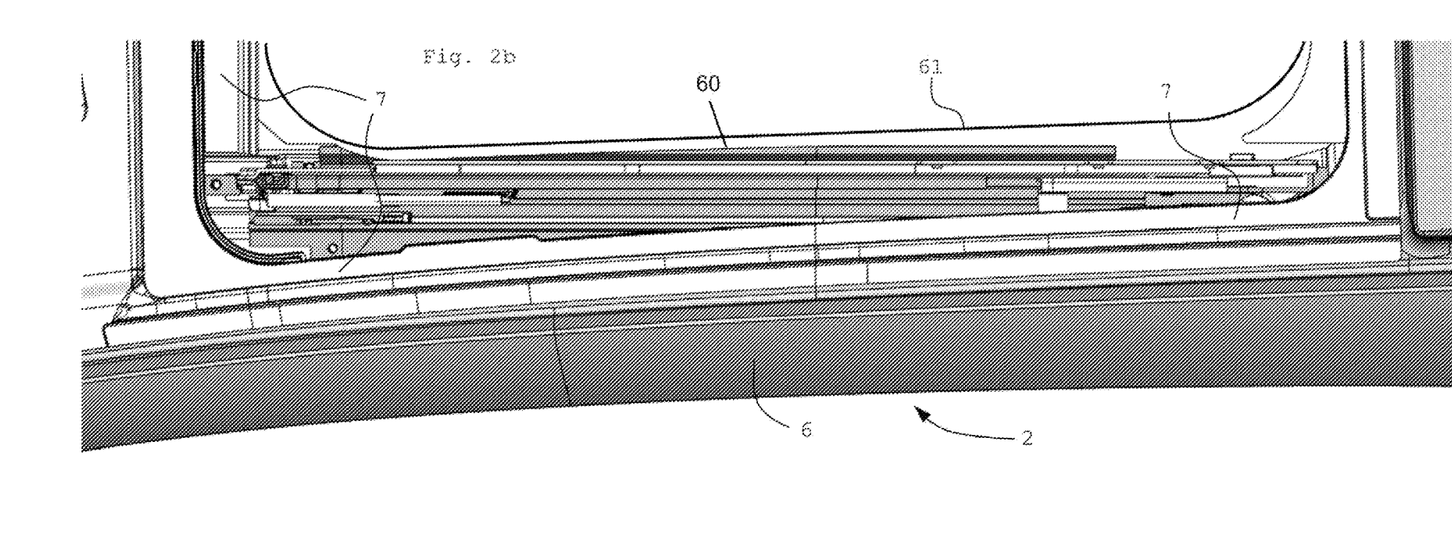
Figure 2C:
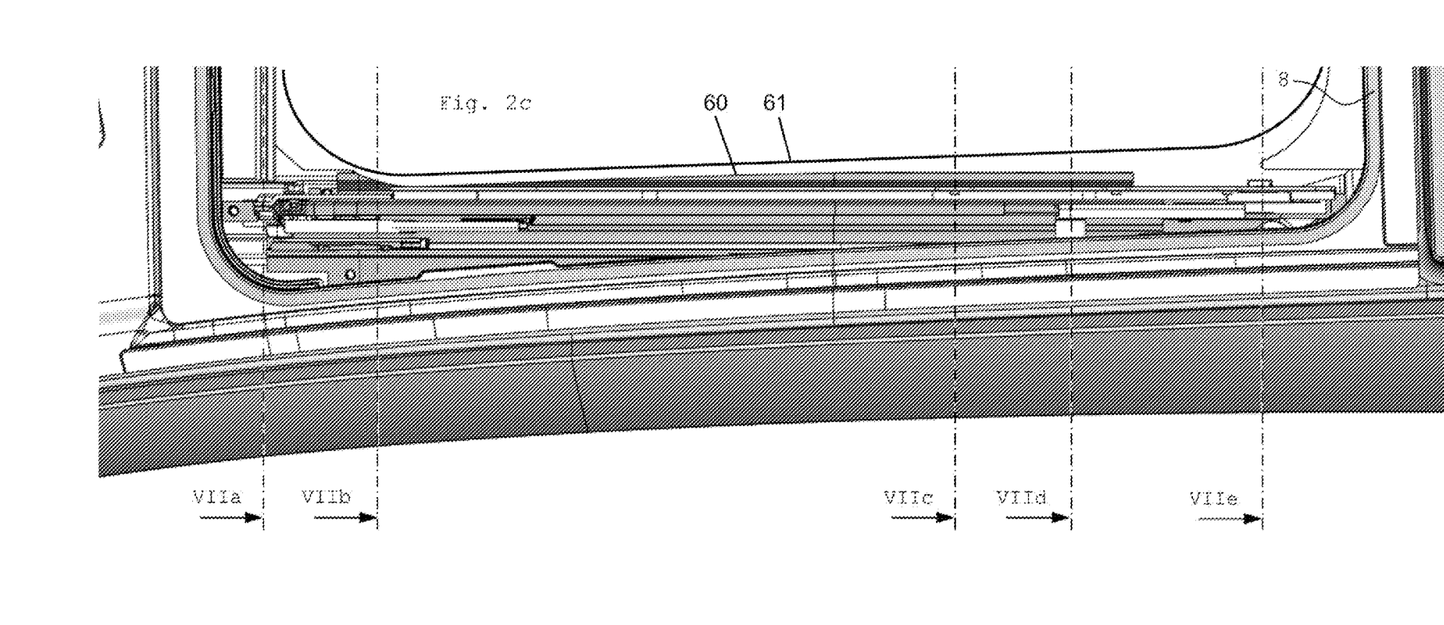
FIG. 2*c* is a view corresponding to that of FIG. 2*b* but provide with a panel seal.

Firstly referring to FIGS. 1 and 2, a roof system is schematically illustrated. In a fixed roof 2 of a vehicle 1 a roof opening 3 is defined which can be closed (FIG. 1*a*) and opened (FIG. 1*b*) by a movable closure, here a rigid, at least partly (semi)transparent panel 4, made of glass, plastic or the like. The roof assembly may include a second panel 4' which is generally a fixed panel 4' but may also be movable as well.

The roof system is a so-called top-loaded roof system in which a stationary part of the roof system is introduced into the roof opening 3 from above, is resting on the fixed roof, normally a flange 5 of a roof beam 6, see FIGS. 2*a* and 7. The stationary part is attached to the fixed roof 2 of the vehicle by a suitable manner, preferably gluing, but also welding and bolting would be possible, depending on the materials used.

The roof system shown here is a so-called spoiler roof in which the panel is movable from its closed position upwardly (at least with its rear side) and then rearwardly to positions above the fixed roof, or in this case above rear panel 4'. The operating mechanism, in particular the supports for panel 4, remains mainly within the roof opening, contrary to a top slider in which rear supports of the panel slide in guide rails that extend or are extended to positions behind roof opening 3.

FIG. 2 shows some of the components of the roof system. A frame 7 forms the main component of the stationary part of the roof system. In this case frame 7 is made from plastic material by injection moulding providing great freedom of design. It carries a panel seal 8 (FIGS. 2c and 7) sealing panel 4 from below. A guide rail 9 is fixed to frame 7 in longitudinal direction below each side edge of panel 4. The length of guide rail 9 is such that it extends substantially from the front to the rear of roof opening 3. An operating mechanism 10 is connected to and guided in each guide rail 9 and an electric motor (not shown) is capable of driving parts of operating mechanisms 10 through drive cables (not shown). A front and rear reinforcement 13, 14 is fixed to frame 7 and to each guide rail 9. A glue strip 15 (FIG. 7) is used to attach frame 7 to flange 5 of longitudinal roof beam 6 and flanges of cross beams (see FIG. 2a).

Figure 3A:
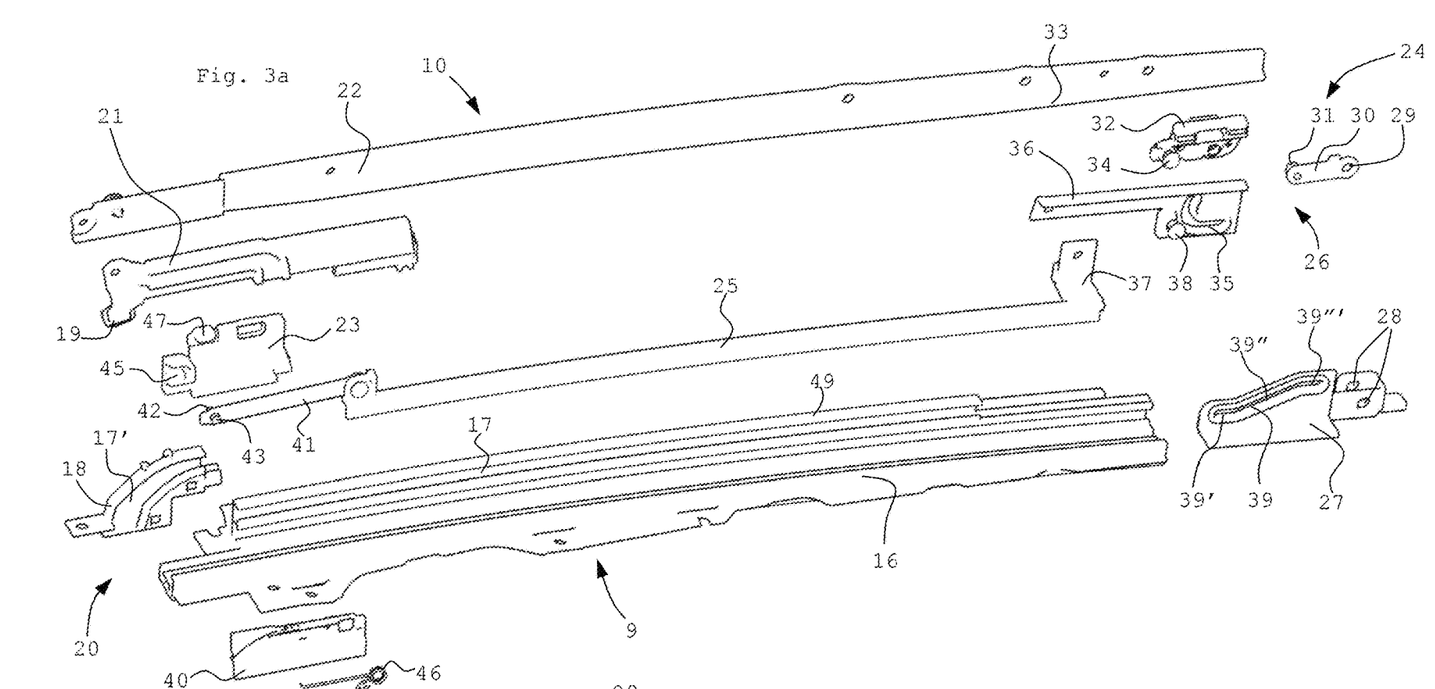
FIGS. 3*a* and 3*b* are exploded views of the parts of the operating mechanism for the panel of the roof system of FIG. 2, on a larger scale and viewed from the out- and inside.
Figure 3B:
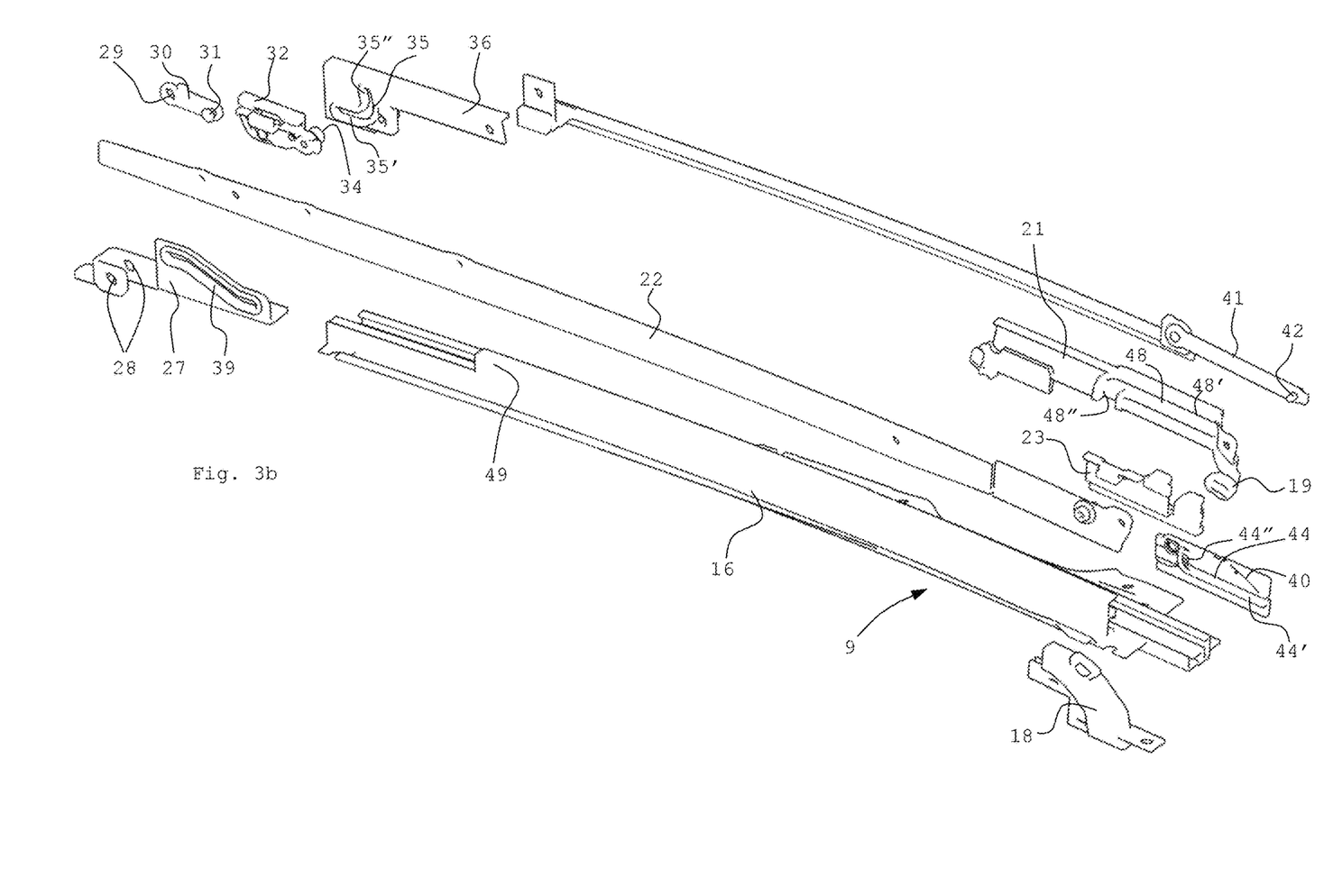

FIGS. 3a and b illustrate schematically one of the guide rails 9 and operating mechanism 10. It should be kept in mind that the roof system comprises an equal guide rail 9 and operating system 10 on the opposite side, albeit configured as a mirror image. Guide rail 9 comprises an extrusion profile 16, for example from aluminium, having one or more guide grooves. The extrusion profile 16 is straight or slightly bent to follow the curvature of fixed roof 2 of vehicle 1. One guide groove 17 is extended to the front by an insert 18 including a downwardly curved portion 17' of guide groove 17. Guide groove 17 guides a front slide shoe 19 of a front support 20 of panel 4, here being formed by a lever 21 pivotally connected on its front end to a panel bracket 22. A driving slide 23 is attached to the drive cable (not shown) and is controlling lever 21 on the one hand and temporarily driving rear support 24 through an elongate connecting member 25.

Driving rear support 24 means moving a lever mechanism 26 such that rear support 24 moves the rear side of panel 4 upwardly to a venting position. The lever mechanism 26 includes a fixed part 27 which is attached to extrusion profile 16 of guide rail 9. The upward portion of fixed part 27 is positioned more inwardly than lever 21 of front support 20. Fixed part 27 comprises pivot holes 28 for lower pivot 29 of lever 30. An upper pivot 31 of lever 30 is connected to slide claw 32 which is slidably supporting panel bracket 22 through a panel bracket guide 33 thereof. The slide claw 32 comprises a guide pin 34 on its outer side engaging a guide slot 35 of a sliding guide 36. This sliding guide 36 is pivotally connected to a slide shoe 37 at the rear end of connecting member 25. Connecting member 25 and slide shoe 37 are guided in a guide groove 50 of guide rail 9. Guide slot 35 of sliding guide 36 includes a substantially horizontal slot portion 35' and a substantially vertical locking slot portion 35" connecting to the front end of slot portion 35'. Sliding guide 36 comprises on its outer side a guide pin 38 engaging a guide slot 39 in fixed part 27. This guide slot 39 includes a substantially horizontal front slot portion 39', a rearwardly and upwardly inclined main slot portion 39" and a substantially horizontal rear slot portion 39'''.

Connecting member 25 is either locked to driving slide 23 or to a locking insert 40 of guide rail 9. For this purpose, a locking lever 41 is pivotally attached to the front end of connecting member 25. Locking lever 41 carries two opposite locking pins 42 and 43, locking pin 43 being in engagement with a locking slot 44 in locking insert 40 and locking pin 42 engaging a locking slot 45 in driving slide 23. Locking slot 44 includes a horizontal front releasing portion 44' and vertical rear locking slot portion 44". A spring 46 loads locking lever 41 upwardly. Locking slot 45 in driving slide 23 is forwardly and upwardly inclined and is open at the front end, such that driving slide 23 may be released from locking lever 41 as soon as locking pin 43 has arrived at the upper end of rear locking slot portion 44" in locking insert 40.

Lever 21 of front support 20 is connected to driving slide 23 by a locking cam 47 on driving slide 23 and locking curve 48 on lever 21. Locking curve 48 includes a substantially horizontal curve portion 48' and a substantially vertical curve portion 48".

Figure 4:
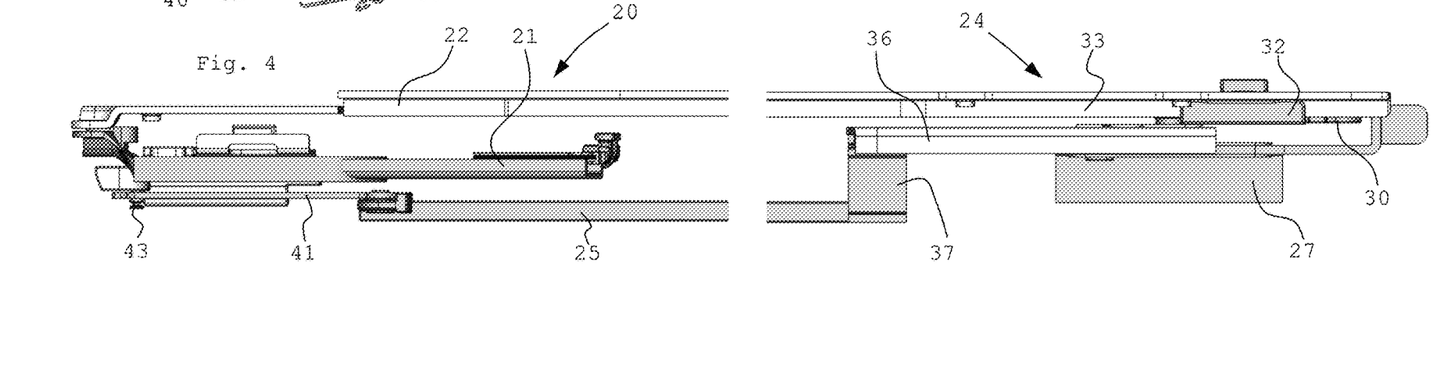
FIG. 4 is a plan view of the operating mechanism of FIG. 3 without the guide rail in which it is mounted.

FIG. 4 shows in a plan view more clearly that parts of rear support 24 are positioned more inwardly than the parts of front lever 21, while connecting member 25 with its rear slide shoe 37 is situated most outwardly in a guide groove 50. As a result, panel bracket 22 with panel bracket guide 33 are positioned inwardly of a flange 49 of guide rail 9 (FIG. 3a, b), while lever 21 of front support 20 is positioned outwardly of said flange 49. Also rear lever 30 of rear support 24 is positioned more inwardly than front lever 21 of front support 20. The flange 49 comprises guide groove 17 for front slide shoe 19 of lever 21 and is the innermost functional flange of guide rail 9. The reason for this is that this roof system does not have a rollo or another sunshade which is normally guided in the innermost guide groove of guide rail 9. A sunshade 62 (e.g. FIG. 7a) may be integrated in panel 4, either an integrated mechanical sunshade or electrochromic glass. Due to this integrated sunshade 62, guide rail 9 may be made narrower and thus a wider daylight opening, and more headroom is created.

FIG. 4 also shows that connecting member 25 is positioned relatively outwardly in guide rail 9. However, this connecting member 25 hardly extends above guide rail 9 so that it does not hinder an outward placement of guide rail 9 partly below frame 7. Sliding guide 36 of rear support 24, which builds higher and moves upwardly, is positioned more inwardly, made possible by slide shoe 37 which connects connecting member 25 and sliding guide 36, but also has a low profile.

From FIG. 2c it is clear that frame 7 extends above guide rail 9 in some places, especially at the rear end where tapered frame 7 is narrower. It is even extending above guide groove 50 for slide shoe 37 of connecting member 25.

FIGS. 5a-5c and 6a-6c illustrate the operation of operating mechanism 10.

Figure 5A:
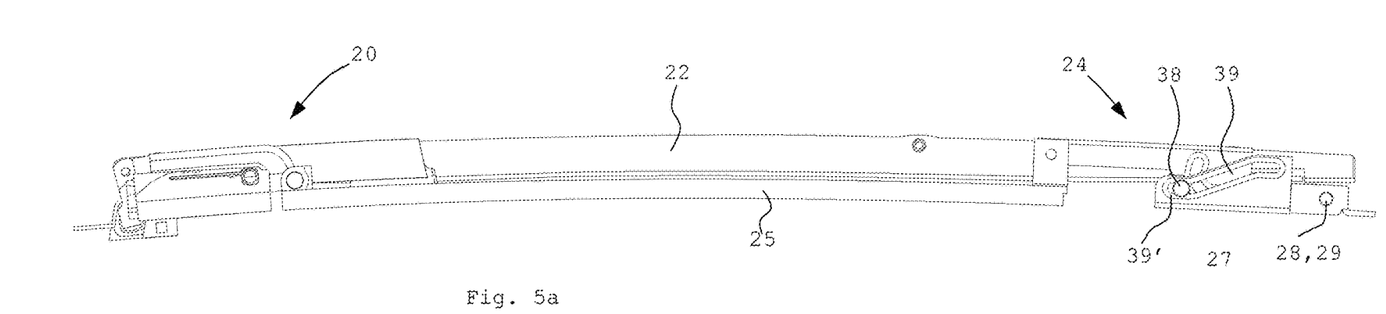
FIGS. 5*a*-5*c* and 6*a*-6*c* are side views from the outside and the inside of the operating mechanism of FIG. 4 in three different positions.
Figure 6A:
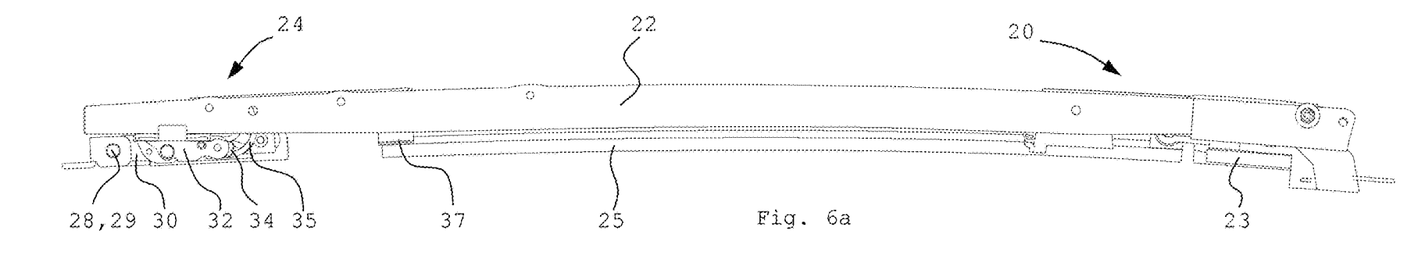

In FIGS. 5a, 6a, panel 4 is in its closed position within roof opening 3. In this closed position lever 21 of front support 20 is in its lower front position with its front slide shoe 19 at the lower front end of guide groove 17 in insert 18 of guide rail 9. Locking pin 43 is at the front end of locking slot 44 in locking insert 40 and locking pin 42 is at the rear end of locking 45 in driving slide 23.

At rear support 24, guide pin 38 of sliding guide 38 is in front slot portion 39' of guide slot 39. Guide pin 34 of sliding claw 32 is at the rear bottom end of guide slot 35 and lever 30 is in is forward and downward position.

Figure 5B:
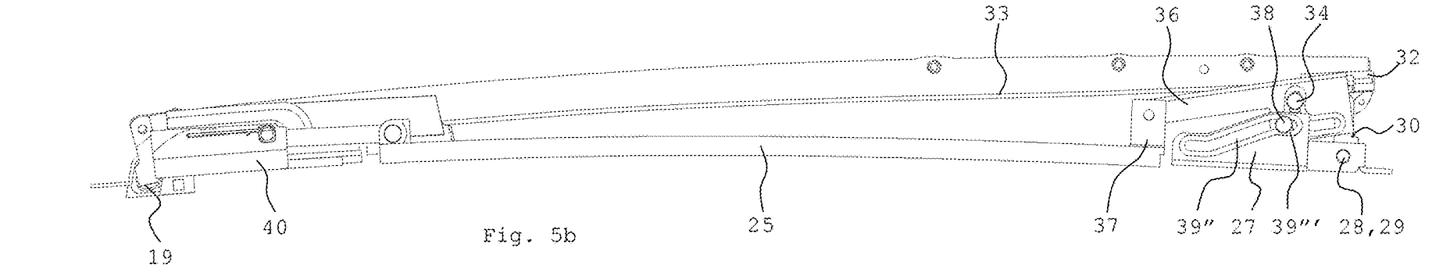
Figure 6B:
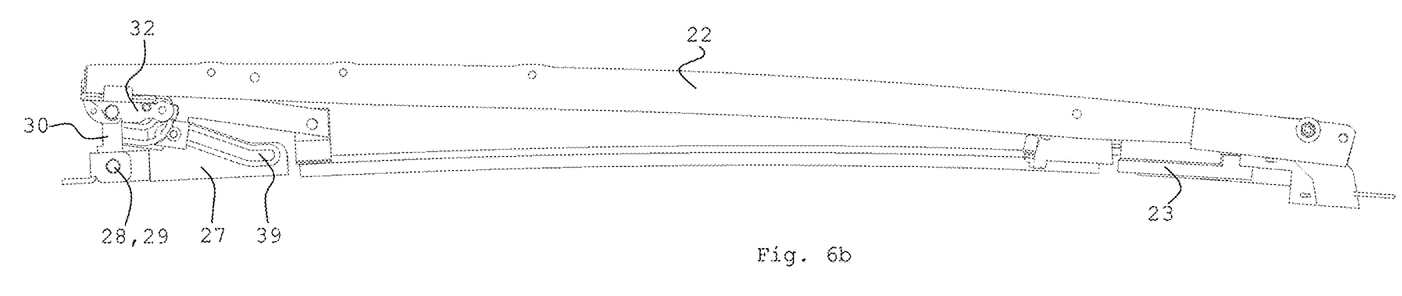

In FIGS. 5b and 6b, panel 4 has been moved into its rearwardly and upwardly inclined venting position. To obtain this position, driving slide 23 has been moved a distance rearwardly such that locking pin 43 of locking lever 41 has been moved along rearwardly through releasing slot portion 44' up to vertical locking slot portion 44" (FIG. 3b). Through crossing slot portion 44' in locking insert 40 and slot 45 in driving slide 23, locking pin 42 is in its lower position in locking slot 45 and therefore locking lever 41 and connecting member 25 are locked to driving slide 23 and move along. Consequently, sliding guide 36 is moved rearwardly by connecting member 25 and pivots upwardly due to guide pin 38 moving upwardly in inclined slot portion 39" in fixed part 27. As a result of the upward and rearward movement of sliding guide 36 guide pin 34 of lever claw slide 32 of rear support 24 is moved upwardly and therefore lever 30 pivots upwardly and rearwardly thereby lifting the rear side of panel bracket 22 and panel 4 upwardly. Claw slide 32 slides along with guide pin 34 of lever 30 a short distance rearwardly along panel bracket guide 33.

Figure 5C:
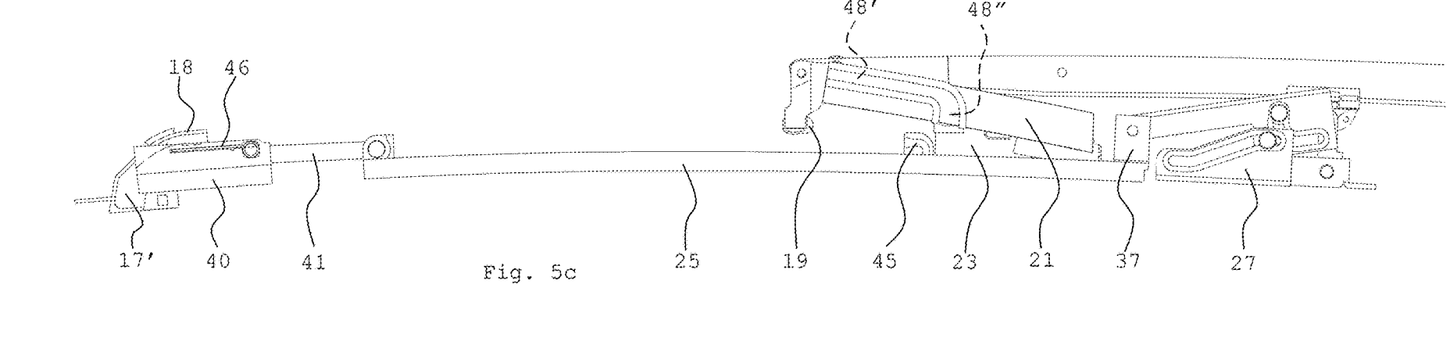
Figure 6C:
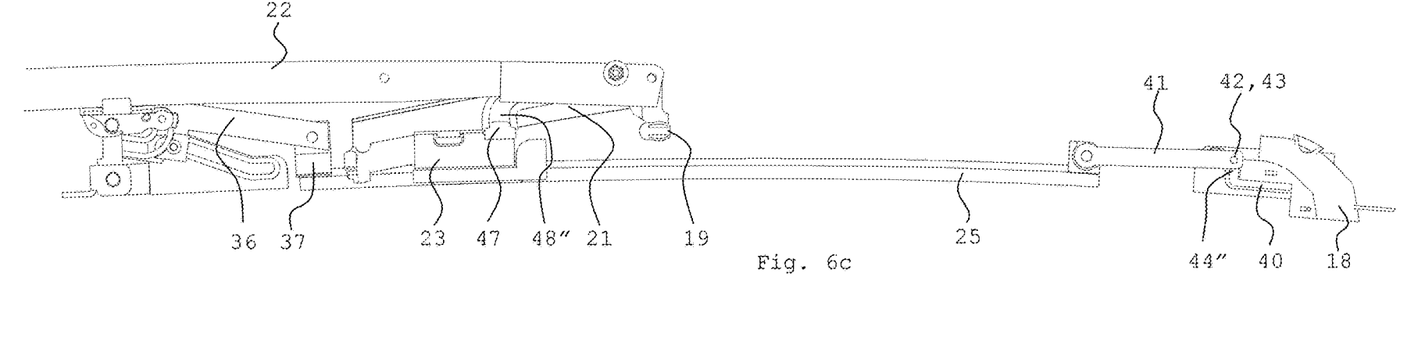

FIGS. 5c and 6c show the rearward open position of panel 4. Locking pin 43 is moved into vertical locking portion 44" and kept there by spring 46. Locking pin 43 locks locking lever 41 to locking insert 40 of guide rail 9, so that connecting member 25 and therefore rear support 24 is locked in its position. The upward movement of locking pin 43 and locking lever 41 is caused by locking pin 42 which is moved up through locking slot 45 (FIG. 5c) and to its open front end so that locking pin 42 may be disengaged from locking slot 45 and thus allowing driving slide 23 to move rearwardly without taking along locking lever 41 and connecting member 25.

Lever 21 of front support 20 is moved rearwardly by driving slide 23 when locking cam 47 has arrived at vertical locking portion 48" of locking curve 48 in lever 21 allowing lever 21 to pivot upwardly due to the displacement of front slide shoe 19 in curve 17' of guide groove 17 (not shown here). Lever 21 is locked against pivoting movements due to engagement of front slide shoe 19 in horizontal guide groove 17 of guide rail 9 and engagement of locking cam 47 in vertical locking curve portion 48".

When connecting member 25 is uncoupled from driving slide 23 when panel 4 is in its venting position a continued rearward movement of driving slide 23 will slide lever 21 of front support 20 rearwardly thereby moving panel bracket 22 rearwardly and panel bracket guide 33 thereof will be allowed to slide along slide claw 32 of rear support 24, so that panel 4 moves with respect to rear support 24.

FIGS. 7a-7e show the relationship between parts in different cross-sections. It also shows some further parts, not shown in FIG. 4. The area between panel seal 8 and a second panel seal 51 may act as a water drain collecting water seeping in beyond panel 4 and may drain water towards the area above flange 5 of roof beam 6 which can drain water to the outside of vehicle 1.

Figure 7A:
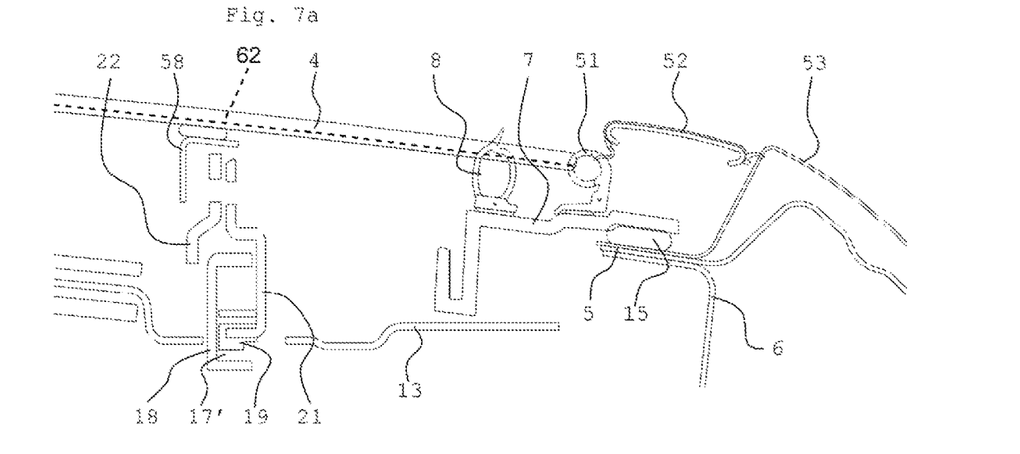

FIG. 7a illustrates how front slide shoe 19 engages guide groove 17 in guide rail insert 18. This insert 18 projects downwardly through a hole in front reinforcement 13. Further it is shown that lever 21 and panel bracket 22 are connected to each other in a position above insert 18/flange 49, so that panel bracket 22 extends on the inner side of insert 18/flange 49 and lever 21 extends mainly on the outer side. This inward position of panel bracket 22 and co-operating rear support enables an outward position of guide rail 9 thereby improving headroom and daylight opening.

FIG. 7a further shows an outer panel seal 51 sealing against the circumferential edge of panel 4 in its closed position. A cover strip 52 covers the area between the outer panel seal 51 and a roof skin 53 of fixed roof 2.

Figure 7B:
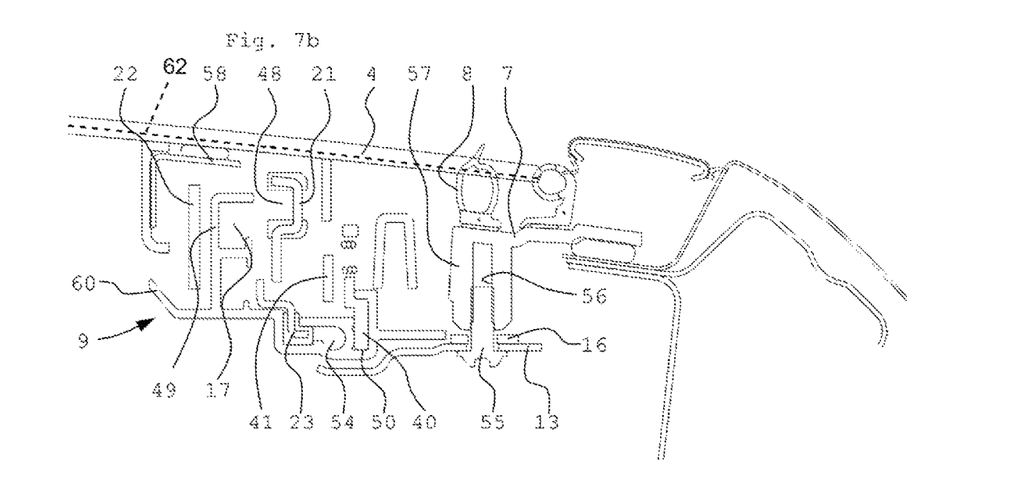

FIG. 7b shows driving slide 23 next to a cable guide 54 for a drive cable (not shown) attached to the driving slide 23. Flange 49 containing guide groove 17 is shown, bordered on the inside by panel bracket 22 and on the outside by lever 21. It further shows locking insert 40 in guide groove 50 and carrying windings of spring 46. On the inside of the locking insert 40 locking lever 41 is located. Below panel seal 8, there is a connection between front reinforcement 13, extrusion profile 16 of guide rail 9 and frame 7. This connection is on the outer side of guide rail 9 and is accomplished by means of a bolt 55 engaging a threaded hole 56 in a distance holder 57 of frame 7.

In the cross-section of FIG. 7c, it is visible that guide groove 50 of connecting member 25 is now substantially below panel seal 8 due to the tapered shape of roof opening 3 and due to the outward position of guide rail 9 below frame 7. It is also shown that a connection between panel bracket 22 and a reinforcement 58 below panel 4 is on the inside of flange 49. This has the advantage that there is no interference for a tool for screw 59 to attach reinforcement 58 to panel bracket as screw 59 can easily be reached from the interior of the vehicle.

Figure 7C:
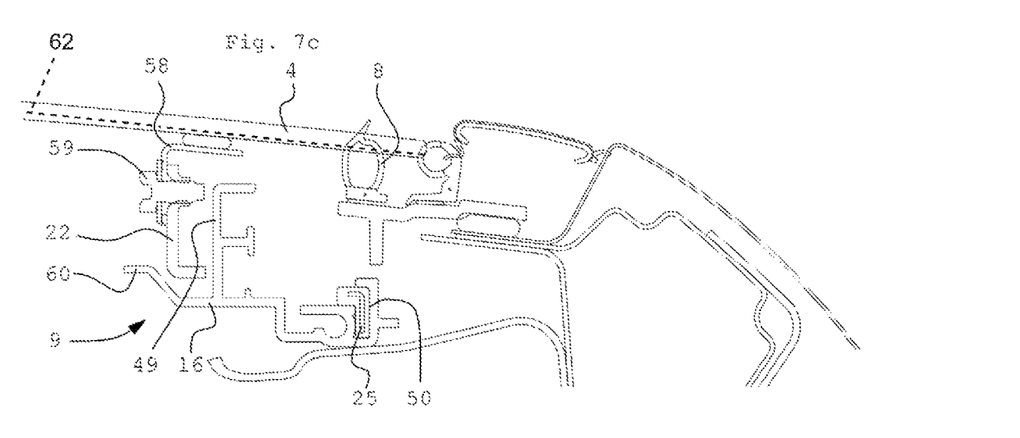
Figure 7D:
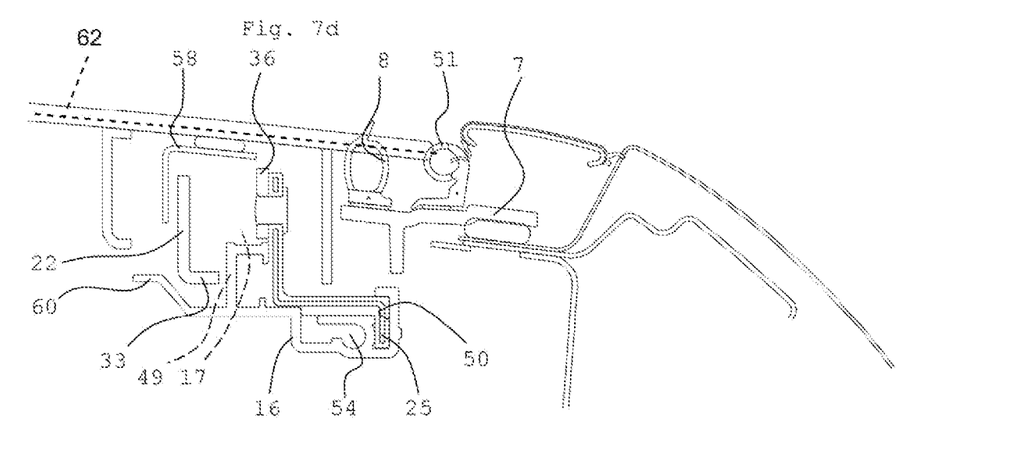

FIG. 7d illustrates the connection between slide shoe 37 of connecting member 25 to sliding guide 36 of rear support 24. Due to the inward position of sliding guide 36 substantially in line with guide groove 17 it is possible to allow guide groove 50 and cable guide 54 to extend in the area below panel seal 8. Panel bracket 22 and panel bracket guide 33 are positioned still inwardly of flange 49.

In the cross-section of FIG. 7d panel seal 8 is positioned closer to the centre of the vehicle and roof system compared to that of FIGS. 7c and 7b due to the tapered shape of fixed roof 2, roof opening 3 and panel 4. As a result, guide groove 50 is now extending below the area between panel seal 8 and outer panel seal 51. Also cable guide 54 in guide rail 9 is now slightly more inwardly with respect to panel seal 8 compared to the cross-section of FIG. 7c.

Figure 7E:
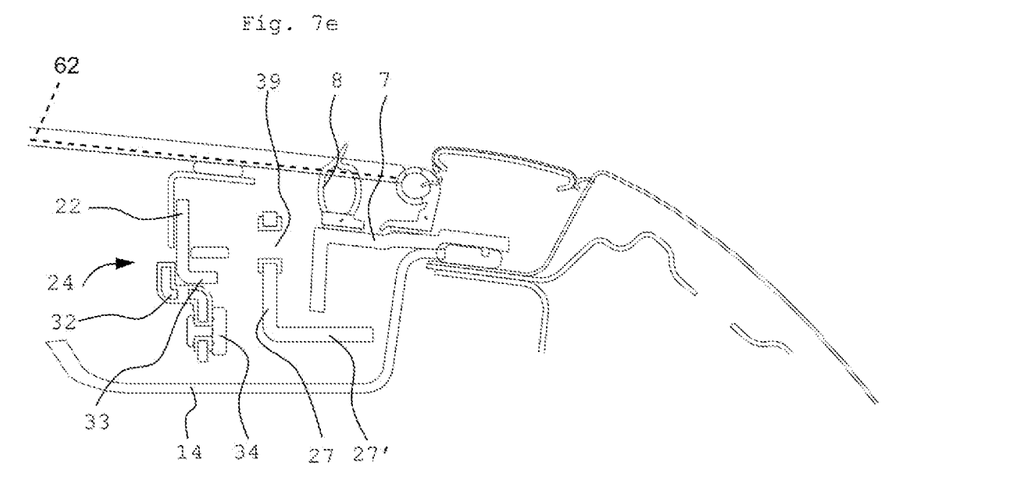

FIG. 7e shows a cross-section near the rear end of guide rail 9, in particular beyond extrusion profile 16 thereof. Guide slot 39 of fixed part 27 is inwardly of panel seal 8 and frame 7, while a horizontal base portion 27' of fixed part 27 extends below frame 7 and panel seal 8. Slide claw slide 32 engages panel bracket guide 33. Rear reinforcement 14 extends below rear support 24.

FIG. 2c and a comparison of FIGS. 7c and 7b show that the inner side of extrusion profile 16 of guide rail 9 is tapered in its front half. This is done by gradually removing a portion of an inner flange 60 of extrusion profile 16 in forward direction. As front support 20 (i.e., lever 21 and driving slide 23) of operating mechanism 10 is positioned more outwardly compared to the moving parts of rear support 24 (parts 30, 32, 36) it is possible to remove a part of said inner flange 60 of guide rail 9 such that it more or less follows the tapering of the roof. If then also a roof lining 61 of the vehicle, which covers the roof system from below, is following the tapering of flange 60 (FIG. 2c) some additional head room and daylight opening is created.

It will be clear from the foregoing description that the invention provides a roof system enabling a very wide daylight opening and additional headroom due to the outward placement of guide rail 9. This is made possible by the operating mechanism of which the upwardly moving or projecting parts of rear support 24 are positioned more inwardly towards a longitudinal centre line of the roof system than front support 20. This makes this operating mechanism very suitable for use with tapered fixed roofs 2 of vehicles 1 and tapered panels 4 of the roof systems mounted therein.

In this description horizontal should generally be understood as parallel to guide rail 9 and vertical generally means perpendicularly to guide rail 9. As extrusion profile 16 of guide rail 9 is slightly curved, horizontal and vertical may vary along the length of guide rail 9.

The invention is not limited to the embodiments described before and shown in the drawings which may be varied widely within the scope of the invention as defined by the appended claims. In principle, it would be possible to combine features of the various embodiments shown and described. Some parts of the roof system are shown and described in more detail in the co-pending patent application EP 21186731.2, the contents of which are incorporated herein by reference thereto in its entirety.

What is claimed is:

1. A roof system for a vehicle having a roof opening in a fixed roof, comprising:
    a stationary part configured to be attached to the fixed roof, the stationary part including guide rails extending in a longitudinal direction substantially parallel to opposite sides of the roof opening, each guide rail including guide grooves bordered by upright guide flanges;
    a panel movably supported on the stationary part and configured to close the roof opening in its closed position and to be moved at least rearwardly to an opened position in which the roof opening is at least partly opened, the panel including a panel bracket guide of a panel bracket extending in a longitudinal direction alongside a corresponding edge of the panel; and
    an operating mechanism for each of opposite sides of the panel, each operating mechanism slidably supported by the guide grooves of one of the guide rails, each operating mechanism comprising:
        a panel front support;
        a driving slide; and
        a panel rear support movable by the driving slide, the panel rear support being connected to the panel bracket guide, said panel bracket guide slidably engaging the panel rear support so as to enable the panel to slide with respect to the panel rear support when the panel front support is driven by the driving slide, wherein on each side of the panel, the panel front support is in engagement with the associated guide rail groove on an outer side of the upright guide flange of each guide rail while the panel bracket guide extends mainly on an inner side of said upright guide flange.

2. The roof system according to claim 1, wherein each rear support is mainly stationary and is positioned substantially behind said upright guide flange of each guide rail.

3. The roof system according to claim 1, wherein the upright guide flange is an innermost functional flange of each guide rail.

4. The roof system according to claim 2 wherein a sunshade is integrated in the panel.

5. The roof system according to claim 1, wherein on each guide rail, the upright guide flange borders the guide groove of a slide shoe of the front support.

6. The roof system according to claim 5, wherein the panel bracket is attached to a panel reinforcement of the panel by screws outside the upright guide flange of each guide rail.

7. The roof system according to claim 5, wherein the slide shoe is part of a slide shoe support which is connected to a lateral outer side of the panel bracket.

8. The roof system according to claim 7, wherein the slide shoe support is a lever of the front support determining a height of a front side of the panel.

9. The roof system according to claim 8, wherein the lever comprises a curve cooperating with a locking cam on the driving slide of the operating mechanism to which a drive member is connected.

10. The roof system according to claim 1, wherein a connecting member connects the driving slide to the rear support of the panel to control the vertical movement thereof.

11. The roof system according to claim 1, wherein a lateral inner side of each guide rail includes a tapering along at least a part of its length to follow at least partly a tapered shaped of the fixed roof, the roof system including a headliner to cover the fixed roof and frame of the roof system from below, said headliner following the tapering of the guide rails.

12. A roof system for a vehicle having a roof opening in a fixed roof, comprising:
    a stationary part configured to be attached to the fixed roof, the stationary part including guide rails extending in longitudinal direction substantially parallel to opposite sides of the roof opening, each guide rail having guide grooves bordered by upright guide flanges;
    a panel movably supported on the stationary part and configured to close the roof opening in its closed position and to be moved at least rearwardly to an opened position in which the roof opening is at least partly opened, the panel including a panel bracket guide of a panel bracket extending in a longitudinal direction alongside a corresponding edge of the panel;
    an operating mechanism for each side of opposite sides of the panel, each operating mechanism slidably supported by grooves of one of the guide rails and, each operating mechanism comprising:
        a panel front support;
        a driving slide drivingly coupled to the panel front support; and
        a panel rear support, the panel rear support being connected to the panel bracket guide, said panel bracket guide slidably engaging the panel rear support so as to enable the panel to slide with respect to the panel rear support when the front support is driven by the driving slide, wherein upwardly movable parts of the panel rear support are positioned more inwardly towards a longitudinal centerline of the roof system than the panel front support.

13. The roof system according to claim 12, wherein the panel bracket extends more inwardly than a slide shoe of the panel front support.

14. The roof system according to claim 13, wherein the panel front support includes a front lever and the panel rear support includes a rear lever, wherein the rear lever is positioned more inwardly than the front lever.

15. The roof system according to claim 12, wherein the panel front support includes a front lever and the panel rear support includes a rear lever, wherein the rear lever is positioned more inwardly than the front lever.

* * * * *